United States Patent [19]

Ishizaki et al.

[11] 3,832,693

[45] Aug. 27, 1974

[54] SYSTEM FOR READING OUT THE COORDINATES OF INFORMATION DISPLAYED ON A MATRIX TYPE DISPLAY DEVICE

[75] Inventors: Hiroyuki Ishizaki, Akashi; Teruo Toba, Kakogawa; Shozo Umeda, Hyogo, all of Japan

[73] Assignee: Fujitsu, Limited, Kanagawa-ken, Japan

[22] Filed: Aug. 21, 1972

[21] Appl. No.: 282,022

[30] Foreign Application Priority Data

Aug. 29, 1971 Japan .............................. 46-66052
Oct. 28, 1971 Japan .............................. 46-85830

[52] U.S. Cl. .......... 340/172.5, 178/19, 340/173 PL, 340/324 A

[51] Int. Cl. ............................................ G08c 21/00

[58] Field of Search ....... 340/172.5, 324 A, 173 LP; 178/18, 19, 20; 315/10

[56] References Cited

UNITED STATES PATENTS

| | | | |
|---|---|---|---|
| 3,342,935 | 9/1967 | Leifer et al. | 178/19 |
| 3,423,528 | 1/1969 | Bradshaw et al. | 178/19 |
| 3,461,454 | 8/1969 | Steckenrider | 178/19 X |
| 3,505,561 | 4/1970 | Ward et al. | 340/324 A |
| 3,506,875 | 4/1970 | Shigeru Watanabe et al. | 340/324 A |
| 3,512,037 | 5/1970 | Eckert et al. | 315/10 |
| 3,531,775 | 9/1970 | Yasuo Ishii | 340/172.5 |
| 3,551,896 | 12/1970 | Baskin et al. | 340/172.5 |
| 3,602,702 | 8/1971 | Warnock | 340/172.5 X |
| 3,651,508 | 3/1972 | Scarborough, Jr. et al. | 340/172.5 X |
| 3,665,419 | 5/1972 | Hartmann et al. | 340/172.5 |
| 3,716,842 | 2/1973 | Belady et al. | 340/172.5 |
| 3,736,564 | 5/1973 | Watkins | 340/172.5 |

*Primary Examiner*—Paul J. Henon
*Assistant Examiner*—Melvin B. Chapnick
*Attorney, Agent, or Firm*—Maleson, Kimmelman and Ratner

[57] ABSTRACT

For reading out the coordinates of information on a matrix type display, a read pulse scans the display surface. In the first embodiment, the display surface is divided into a plurality of blocks in both X and Y directions. First, the scanning is carried out with regard to the blocks in the X direction. Second, when an information signal is detected in any block, the abovementioned operation is repeated with regard to the Y direction, and the coordinates of the information signal can be read out. In the second embodiment, the display surface is divided into 2 blocks in both X and Y directions and the scanning is first carried out with regard to the two blocks in the X direction. When the information signal is detected in one of the two blocks, the block is further divided into two blocks. By repeating this process, the electrode which includes the information signal is detected. Secondly, the above-mentioned operation is repeated with regard to the Y direction, and the coordinates of the information signal can be read out. Further, in the abovementioned two embodiments, the coordinates can be read out whether the coordinates are in the fired cell or in the non fired cell without carrying out special operations.

5 Claims, 21 Drawing Figures

SYSTEM FOR READING OUT THE COORDINATES OF INFORMATION DISPLAYED ON A MATRIX TYPE DISPLAY DEVICE

The present invention relates to a system for reading out the coordinates of an information signal in a matrix type display device such as a plasma display panel.

BACKGROUND OF THE INVENTION

As is well known, in a matrix type display, for example the matrix type plasma display, utilizes firing spots in cells utilizing gas discharge as display elements. The cells utilizing gas discharge are formed in cross points between a group of X (row) electrodes and a group of Y (column) electrodes. In operation, alternating sustaining voltage $V_S$ which is smaller than the firing voltage $V_F$ is continuously supplied between the X and Y electrodes corresponding all cells utilizing gas discharge. When the write pulse voltage $V_W$ is supplied between the electrodes superimposed on the sustaining voltage $V_S$ (or independently from the sustaining voltage $V_S$), and the peak value of the voltage supplied between the electrodes exceeds the firing voltage $V_F$ of the cell, the firing spot is produced in the cell. Once the cell utilizing gas discharge is fired, a wall charge corresponding to the polarity of the supplied voltage is accumulated in the dielectric layer covering the electrodes of the cell and a wall voltage $V_Q$ is produced. Further, when the potential difference between this wall voltage $V_Q$ and the half period of the sustaining voltage $V_S$ next supplied exceeds the firing voltage $V_F$, the firing spot again is produced in the cell and the polarity of the wall voltage becomes the opposite of the prior wall voltage. In this manner, the firing spot is maintained every time the polarity of the sustaining voltage changes. That is, the write information is memorized by applying the sustaining signal $V_S$ which is smaller than the firing voltage $V_F$.

When a pulse voltage having a small width, or an erase pulse signal $V_E$ having a lower voltage than the minimum sustaining voltage $V_{Smin}$, is supplied to the above-described cell, the firing is carried out at once. However, the wall voltage $V_Q$ is not produced. Consequently the firing spot is not produced in spite of the continuation of the sustaining voltage; that is, the displayed information is erased.

Such plasma display panel can be used for the display device of an electronic computer when it is required to read out the displayed information by using, for example a light pen detector in the same manner as in the cathode ray tube display device. The above-mentioned object may be achieved by a read method which periodically ceases the A.C. sustaining voltage, in accordance with a clock pulse, and scans the display surface with the read pulse in the ceasing period. Such a method supplies the read pulse to every unit cell so that scans are accomplished point by point and the firing spot of the firing cell is detected.

However, the above-mentioned method has a drawback in that it requires a long read time in the case where the display area increases and the number of the cells also increase. For example, in the matrix type display constructed with 512 × 512 lines, when we assume that the cycle time is 20 $\mu S$, the above-mentioned methods require about 5 seconds maximum for read out of the displayed information.

SUMMARY OF THE INVENTION

An object of the present invention is to provide a system for read out of the coordinates of the information signal which overcomes the above-mentioned drawback.

Another object of the present invention is to provide a system for rapid read out of the coordinates of the information signal.

A further object of the present invention is to provide a system wherein the display surface is divided into a plurality of blocks in the *X* direction, the scanning is carried out with regard to these blocks, and then the cells belonging to the line wherein the information signal is included are scanned in the *Y* direction, thereby reading out the coordinate of the information signal.

A still further object of the present invention is to provide a system wherein the display surface is divided into two blocks in the *X* direction, the scanning is firstly carried out with regard to the blocks in the *X* direction, one of the blocks wherein the information signal is included is further divided into two blocks, this process is repeated, and finally the line including the cells belonging to the electrode wherein the information signal is included is scanned in the *Y* direction in the same manner as in the *X* direction, thereby reading out the coordinates of the information signal.

Still another object of the present invention is to provide a system wherein the coordinate can be read out whether the coordinates are of a fired cell or in a non fired cell without carrying out a special operation.

Further features and advantages of the present invention will be apparent from the ensuing description and the accompanying drawings to which, however, the scope of the invention is in no way limited.

DETAILED DESCRIPTION OF THE INVENTION

Write and Erase Operation

Figure 1:
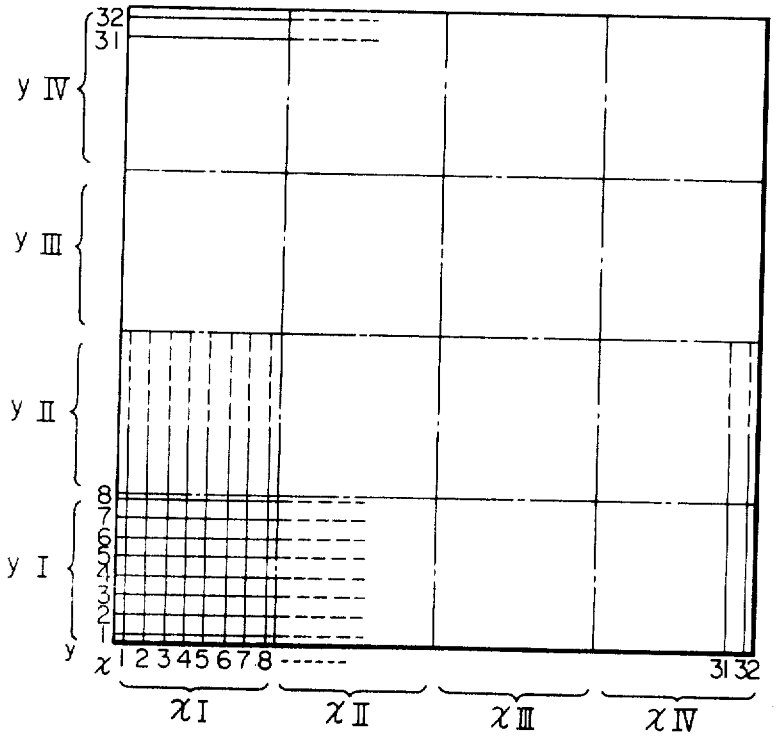
FIG. 1 is a diagram showing one embodiment of the display of the present invention.

Referring to FIG. 1 which shows a principle of one embodiment of the present invention, for simplicity of explanation we assume that the matrix type display is composed of, as one example, 32 × 32 lines. These *x* lines and *y* lines are respectively divided into four blocks which are respectively composed of eight lines. As shown in FIG. 1, the *x* lines are divided into *x*I, *x*II, xIII and xIV; the y lines are divided into yI, yII, yIII and yIV. Firstly for the purpose of determining in which block the light pen is situated, the scanning is carried out with regard to the blocks in the direction of X axis. When the light pen has detected a firing spot due to a read pulse, for example, in block xII, the eight lines belonging to the block xII are individually scanned and the X line belonging to the detected firing spot is determined. This is read out by the counter. Next, the same operation is carried out with respect to the blocks in the direction of the Y axis. When, for example, the light pen has detected a firing spot in block yII, the eight lines belonging to the block yII are individually scanned and the Y line belonging to the detected firing spot determined. By this method the coordinates of the X and Y axes of the spot whereon the light pen is situated can be read out.

In the matrix type display composed of, for example, 512 × 512 lines, when we assume that the cycle time is 20 $\mu$S, the conventional methods which read cell by cell require about 5 seconds maximum for read out of the displayed information. However, according to the present invention wherein the display panel is divided into eight groups in one direction, each composed of 64 lines, the above-mentioned time is decreased to only 0.003 ( $=(8+64)\times 20\times 2$) second.

Figure 2:
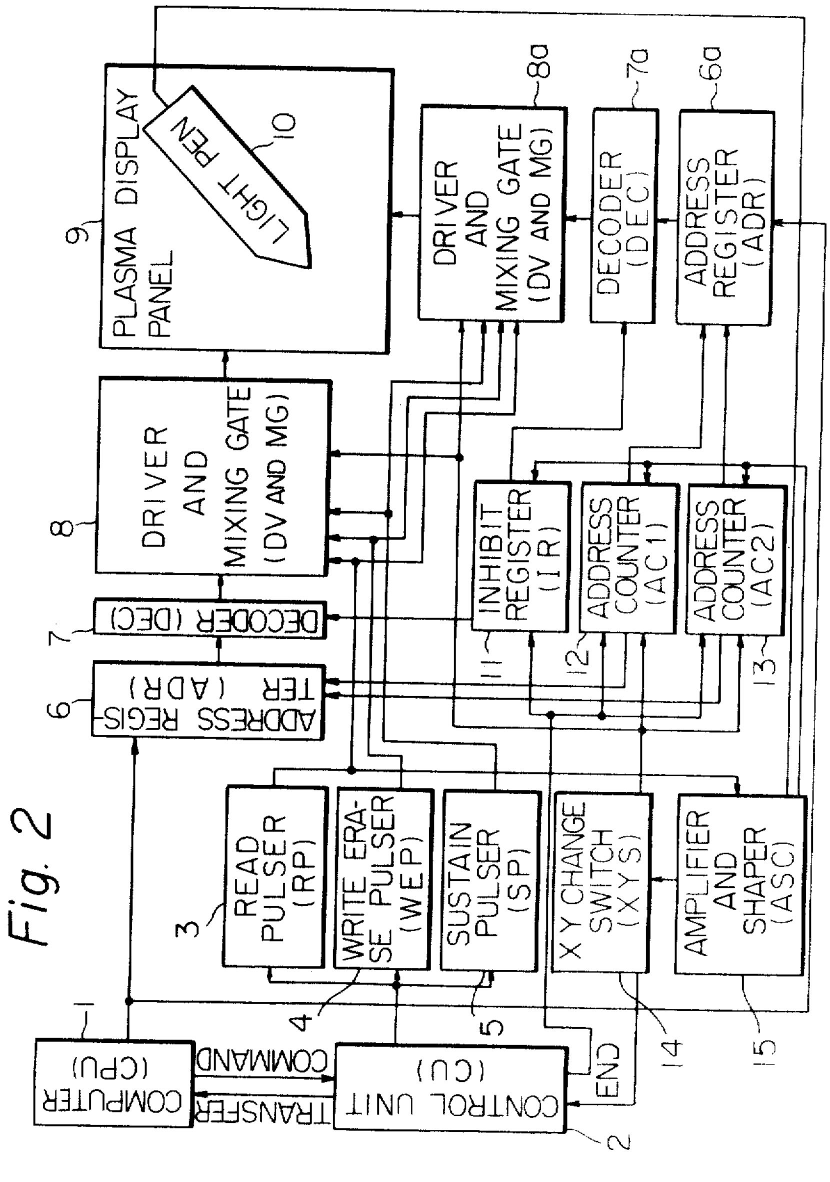
FIG. 2 is a block diagram of a read out system having the display of FIG. 1 according to FIG. 1, FIGS. 3A – 3E are detailed block diagrams showing a circuit construction of the main parts in the block diagram of FIG. 2, FIGS. 4A – 4J are waveforms showing a function of a matrix type display according to the present invention.
Figure 3A:
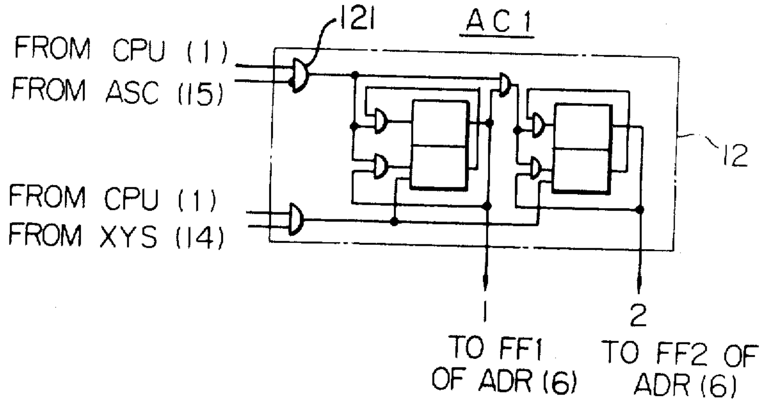
Figure 3B:
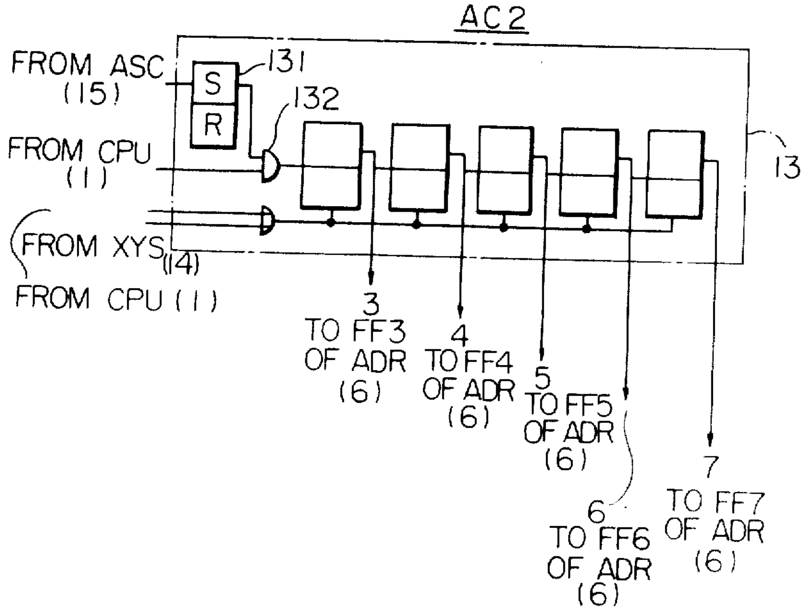
Figure 3C:
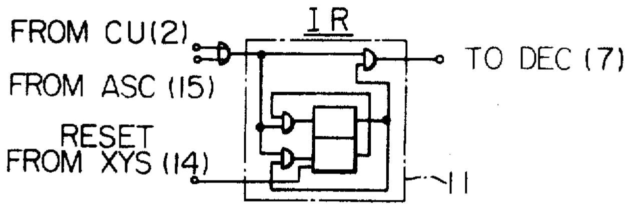
Figure 3D:
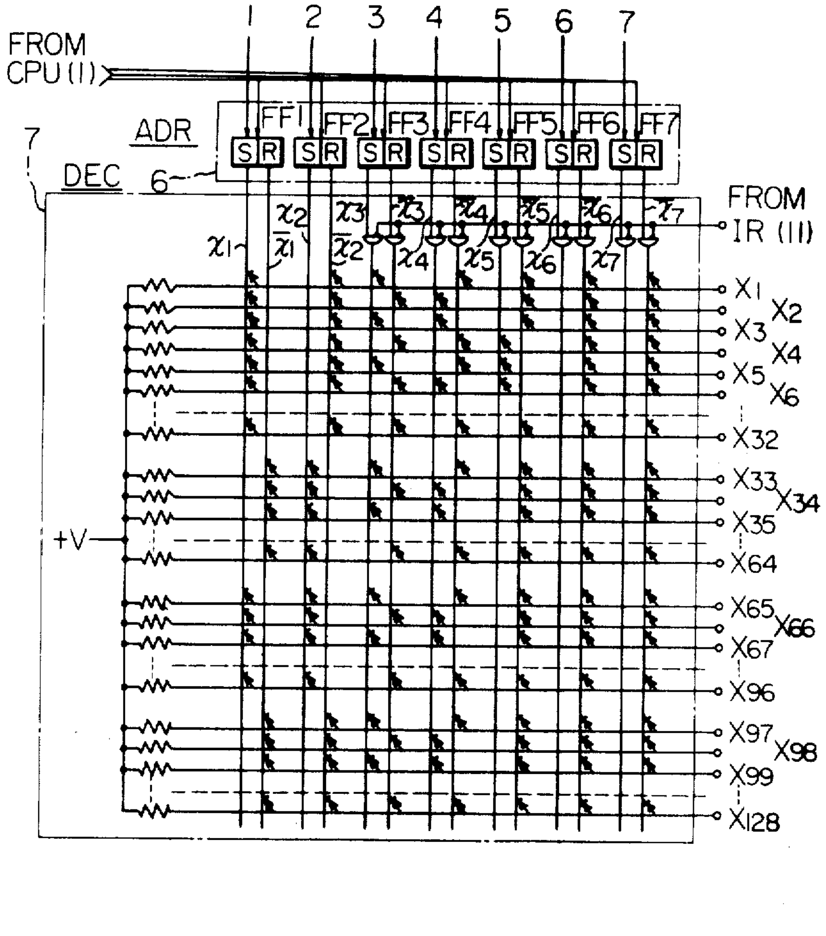
Figure 3E:
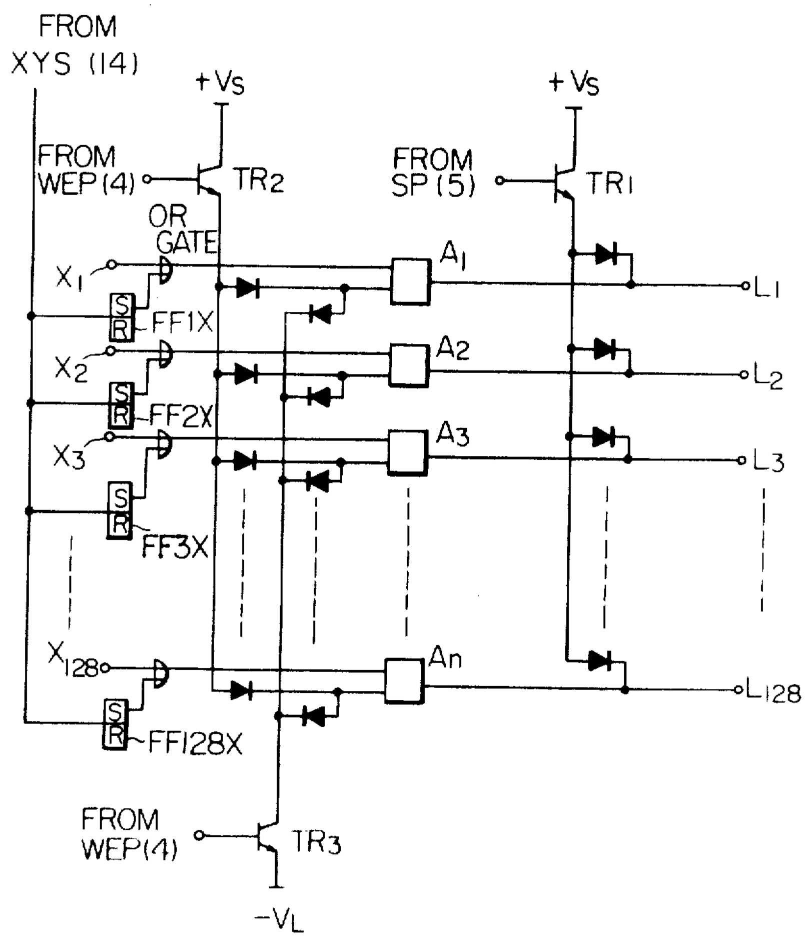
Figures 4A, 4B, 4C, 4D, 4E, 4F:
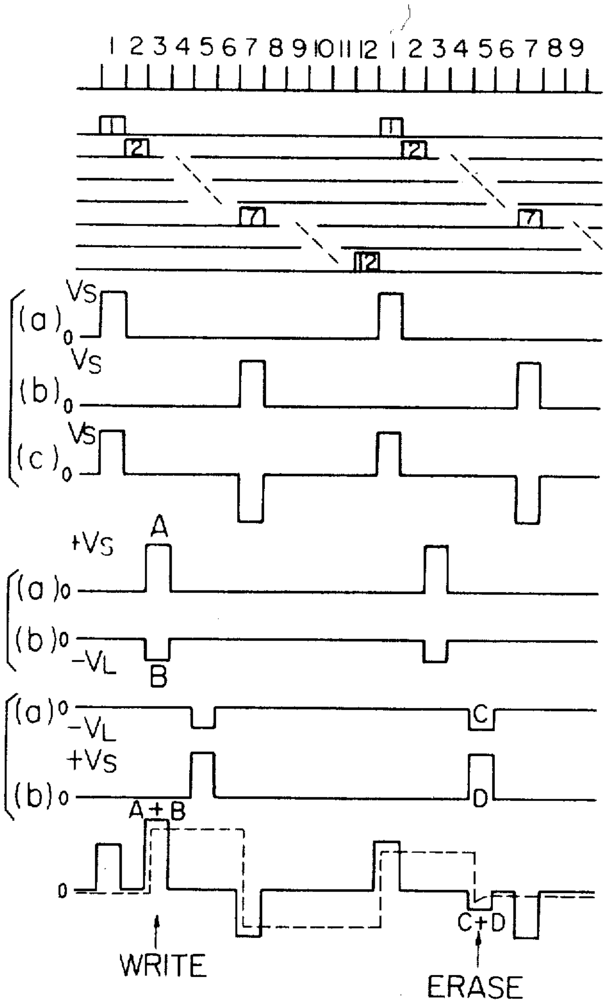

FIG. 2 shows a block diagram for realizing the above-mentioned principle, and it may be assumed that for example, the matrix type display is composed of 128 × 128 electrodes. Referring to FIG. 2, when a control unit (CU) 2 receives a command signal for use of the plasma display panel from a computer (CPU)1, the control unit 2 which includes for example, a twelve number system counter, generates a clock pulse as shown in FIG. 4A, which is supplied to a read pulser (RP)3, a write erase pulser (WEP)4 and a sustain pulser (SP)5. The first and the seventh counted output, that is "1" and "7", shown in FIG. 4B are supplied, respectively, from the sustain pulser 5 to the base of the transistor $TR_1$ of driver and mixing gates (DV and MG) 8 and 8a. A series of pulses as shown in FIG. 4C is supplied, via the transistor $TR_1$ of driver and mixing gates 8 and 8a to lines $L_1$, $L_2$, . . . $L_{128}$ as shown in FIG. 3E. FIG. 3E shows a driver and mixing gate 8 for the X electrodes, which is duplicated for the Y electrodes. Referring to FIG. 4C, (a) shows a series of pulses for X the electrodes, (b) for Y the electrodes, and (c) is a series of sustaining pulses appearing between all X and Y electrodes, each of these pulses has voltage value $V_S$.

It may be assumed that the control unit 2 receives a write command signal from the computer 1 and that data which shows the coordinate of a point to be fired is supplied from the computer 1 to the address register 6 and 6a. Then the third counted output, that is "3", shown in FIG. 4B, is supplied from a write and erase pulser 4 to the driver and mixing gates 8 and 8a. This third counted output, that is 3, shown in FIG. 4B, is supplied to a base of transistor $TR_2$ in the driver and mixing gate 8 shown in FIG. 3E. Further this third counted output 3 is supplied to a base of a transistor $TR_{3a}$ not shown and duplicated for $TR_3$, in the driver and mixing gates 8a. The transistors $TR_2$ and $TR_{3a}$ are therefore placed in their ON states. In this condition, the data signal, that is 7 bits of data, is supplied from the computer 1 to the address register 6 and 6a as shown in FIG. 3D, and applied to the flip-flop circuits $FF_1-FF_7$ included in the address register 6 and 6a. Each of the flip-flop circuits $FF_1-FF_7$ is set or reset in accordance with the code of the data supplied from the computer 1. A write pulse A which has voltage $V_S$, as shown in FIG. 4D(a), is supplied to a selected X side electrode and a write pulse B which has voltage $-V_L$, as shown in FIG. 4D(b), is supplied to a selected Y side electrode. Therefore, the cell situated in the cross point of the selected X and Y side electrodes satisfies the condition shown in FIG. 4F. That is, the voltage applied between X and Y electrodes exceeds a firing voltage as shown in $A+B$ in FIG. 4F and the above-mentioned cell is placed in a firing condition. When the cell has been placed in a firing condition, the wall charge is formed and then the firing is repeated every time the sustaining voltage $V_S$ is repeated.

When the control unit 2 receives the erase command signal, and data which shows the coordinates of a point to be erased is supplied from the computer 1 to the address register 6 and 6a, the fifth pulse shown as 5 in FIG. 4A is supplied from the write erase pulser 4 to the driver and mixing gates 8 and 8a. Also the computer 1 supplies the data of the address to be erased to the flip-flops $FF_1-FF_7$ in the address register 6 and 6a. The line to be erased is then selected by set and reset of the flip-flop $FF_1-FF_7$. The line to be erased, decoded in the decoders 7 and 7a, is selected from lines $X_1-X_{128}$ and $Y_1-Y_{128}$, which are respectively connected to the driver and mixing gates 8 and 8a as shown in FIG. 3E. As a result of this corresponding gate among gates $A_1-A_{128}$ is opened. Then, the erase pulse as shown in (a) and (b) of FIG. 4E are supplied from the driver and mixing gates 8 and 8a to the selected X and Y side electrodes. A voltage $C+D$ as shown in FIG. 4F is supplied between the X and Y lines and the firing is caused once. However, the wall voltage formed by this firing is very small and consequently the firing can not be continued and is erased even if the sustaining voltage is supplied successively.

The above description is of the write and erase operation which is carried out by the command signal of the computer 1.

The present invention as it concerns the reading with a light pen of the displayed information which is written by the above-described operation will now be discussed.

When the coordinates of the plasma display panel 9 sent to the computer 1 the read command is supplied from for example, a typewriter not shown in FIG. 2, to the control unit 2. The control unit 2 controls the read pulser 3. The signal which shows whether the coordinate position where the light pen is situated is fired or not is supplied to the control unit 2.

Figures 4G, 4H, 4I, 4J:
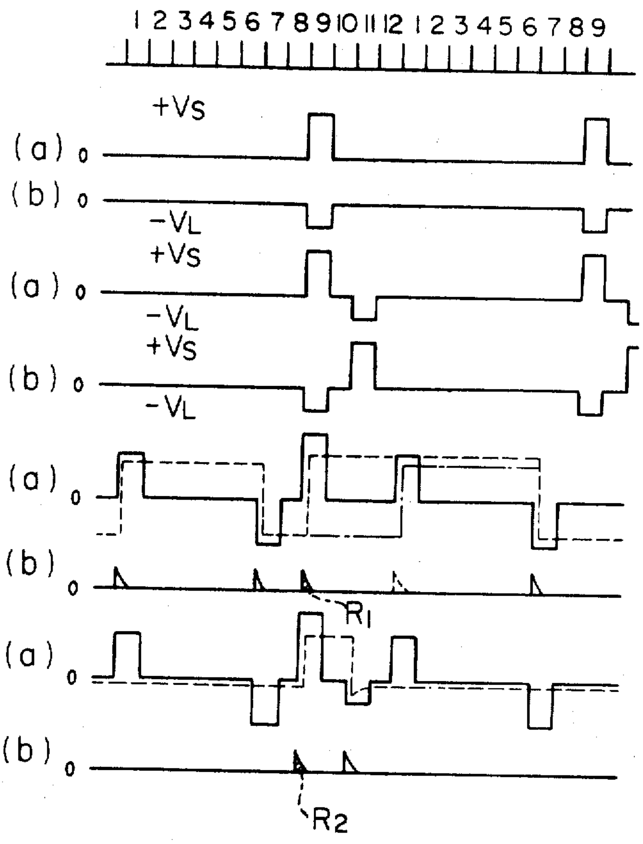

When the position of the light pen 10 is on a fired cell, read pulses for a fired cell, as shown in FIG. 4G, are respectively supplied to the X and Y side electrodes with a timing of the ninth pulse. First, the X side electrodes are divided into four groups, each including 32 electrodes. Referring to FIG. 3A, the clock pulse having a timing of the ninth pulse is supplied from the control unit 2 to the first address counter 12. The digital outputs of the address counter 12 output terminals are respectively supplied to drive the flip-flops $FF_1$ and $FF_2$ of the address register 6, of FIG. 3D. The outputs of the flip-flops $FF_1$ and $FF_2$ then select one of the four groups of electrodes: That is, ($X_1$ . . . $X_{32}$), ($X_{33}$ . . . $X_{64}$), ($X_{65}$ . . . $X_{96}$) or ($X_{97}$ . . . $X_{128}$). In this condition, an inhibit resistor (IR) has been set by the control signal sent from the control unit 2, when the control unit 2 received the read command signal supplied from the typewriter not shown in FIG. 2, and the control unit 2 sends a signal to the decoder 7 and 7*a* so as to annul the output of the flip-flops $FF_3 - FF_7$ shown in FIG. 3D. As a result of this, in the X side, the electrodes ($X_1 \ldots X_{32}$) are first selected, and in the *Y* side, *XY* change switch 14 sends a signal to the driver and mixing gate 8*a* which is duplicated for the driver and mixing gate 8 as shown in FIG. 3E. When the signal is sent to the flip-flop $FF_{1Y} - FF_{128Y}$, not shown and duplicated for $FF_{1X} - FF_{128X}$ of the *X* side driver and mixing gate 8, the flip-flop $FF_{1Y} - FF_{128Y}$ are set to the binary 1 condition and all gates $A_1 - A_{128}$ are opened. That is, in the *X* side, the AND gates ($A_1 \ldots A_{32}$) belonging to one group composed of thirty two electrodes ($X_1 \ldots X_{32}$) are opened, and the *Y* side, all AND gates belonging to all electrodes are opened. In this state, in the timing of the ninth pulse of the clock the pulse $+ V_S$, shown in (*a*) of FIG. 4G, is supplied to the lines ($X_1 \ldots X_{32}$) in the *X* side, and the pulse $- V_L$, shown in (*b*) of FIG. 4G, is supplied to all lines in the *Y* side. Then one fourth of the cells on the display panel are fired. When the light pen 10 is situated in the above-mentioned fired portion, the pulse, shown by hatched lines in FIG. 4I(*b*), is sent from the light pen 10 to an amplifier and shaper 15. This pulse is shaped therein and the shaped pulse is applied to the inhibit register 11, the first address counter 12 and the second address counter 13. With respect to the first address counter 12, the clock pulse having a timing of the ninth pulse is inhibited by applying a pulse from the amplifier and shaper 15 to the inhibit gate 121, and the output of the first address counter 12 is set to the previous state. Therefore, the flip-flop circuits $FF_1$ and $FF_2$ are also set to the previous state. A flip-flop 131 in the second address counter 13 is set by applying a pulse from the amplifier and shaper 15, and AND gate 132 is opened. Then the address counter 13 starts to count the clock pulses as shown in FIG. 4A from the control unit 2. With respect to the pulse via the second address counter 13, the flip-flop circuits $FF_3 - FF_7$ included in the address register 6 are placed in a set condition; the outputs of the flip-flop circuit $FF_1$, $FF_2$ and $FF_3 - FF_7$, are supplied to the decoder 7; and one electrode is selected in order from the thirty two electrodes ($X_1 \ldots X_{32}$). In this condition, of course, all *Y* the electrodes are selected as above-mentioned. Then, the read pulse (*a*) of FIG. 4G is applied to the one X electrode selected and the read pulse (*b*) to all *Y* the electrodes. The pulse $R_1$, shown by patched lines in FIG. 4I, is sent from the light pen to the amplifier and shaper 15. Then at this time, the amplifier and shaper 15 command signal the *XY* change switch 14 whose output pulses are supplied to the driver and mixing gates 6 and 6*a*, so that all X the electrodes are selected. With respect to the *Y* electrodes, the same operation is carried out as with the *X* electrodes. The *XY* change switch 14 sends the reset signal to first and second address counter 12, 13 and inhibit register 11, so they turn to a reset state. When the *XY* change switch 14 receives the second command signal from the amplifier and shaper 15, it sends the end signal to the control unit 2. Then control unit 2 sends the transfer command signal to the computer 1, so that the computer 1 receives address data from the address register 6 and 6*a*.

SECOND EMBODIMENT

Figure 5:
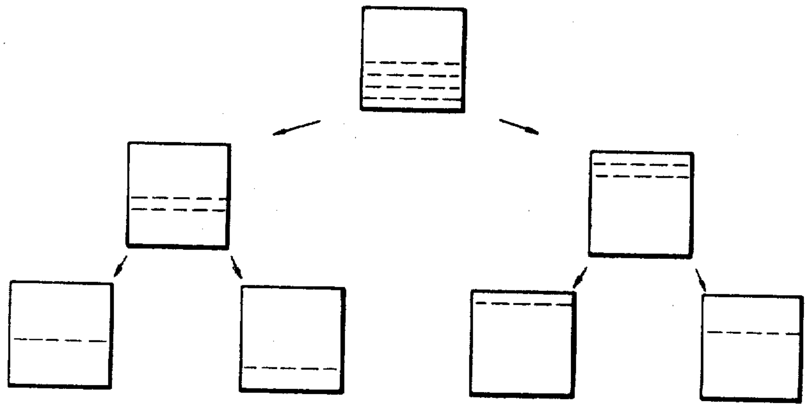
FIG. 5 is a diagram showing a principle of another embodiment of the present invention.

FIG. 5 shows another embodiment according to the present invention. As shown in FIG. 5, first, the display panel is divided into two blocks and the position of the light pen in the upper or lower block is detected. Then the portion in which the light pen is positioned is further divided into two blocks. This operation is repeated and the line on which the light pen is positioned is selected. The above-mentioned operation is carried out with regard to both the *X* and *Y* axes and finally the coordinates of the light pen can be read out.

Figure 6:
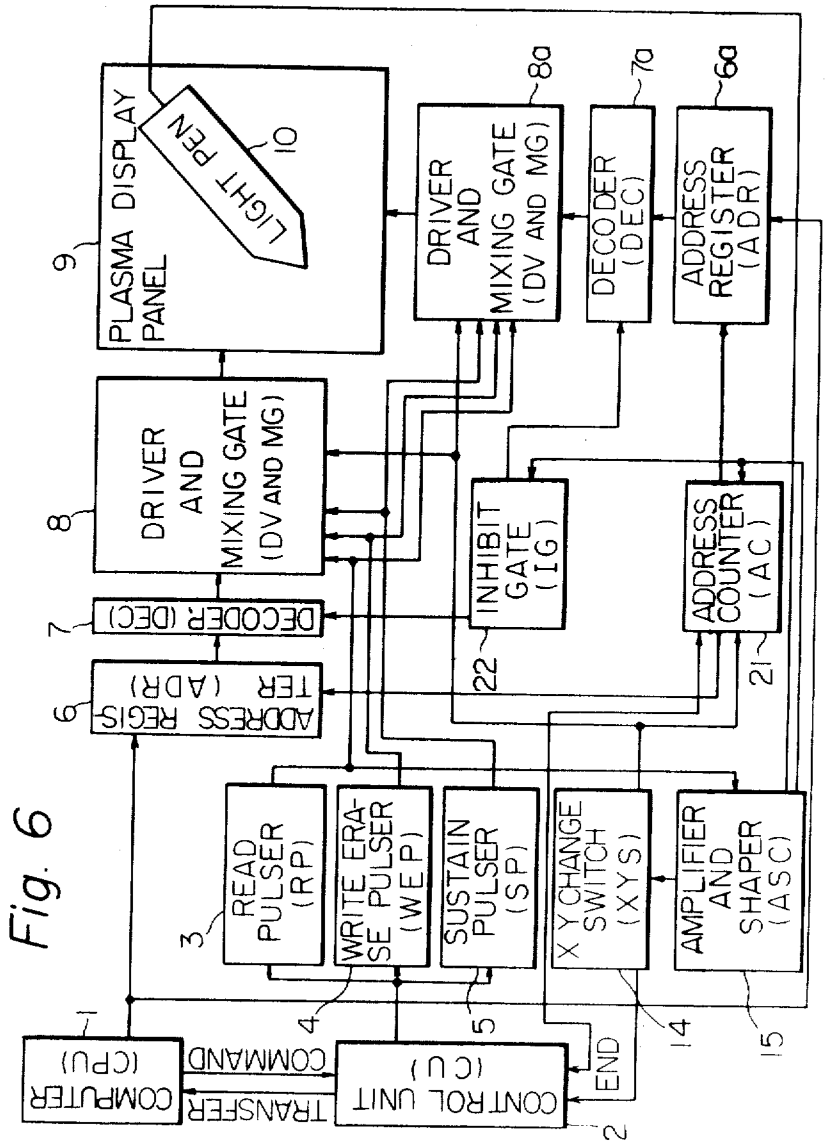
FIG. 6 is a block diagram of a read out system according to FIG. 5.
Figure 7:
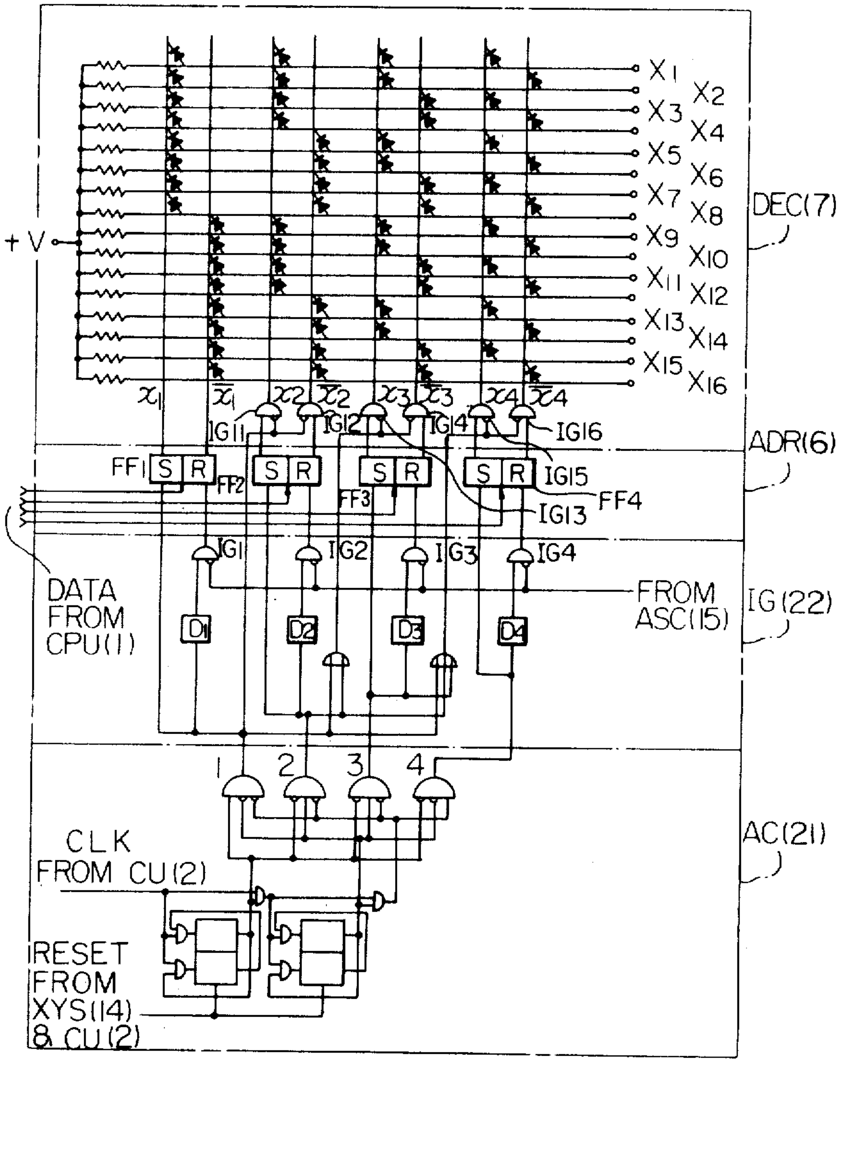
FIG. 7 is one example of the details of the circuit shown in the block diagram of FIG. 6.

Next the operation of the block diagram of FIG. 6 we will explained with reference to FIG. 7 which shows one example of the detailed circuit diagram of the present invention. In order to simplify the explanation, we will assume that the number of electrodes of each of the *X* and *Y* axes is 16 lines and the input signal is composed of four bits. The construction of the circuit is then the same as FIG. 7.

The control unit 2 receives from the operation board, not shown, the command signal to carry out the reading by dividing, and the information as to whether the light pen 10 is positioned on a fired cell or a non fired cell. In this embodiment, it is noticeable that the waveform of the read pulse differs according to whether the light pen is positioned on a fired cell or a non fired cell. When the light pen is positioned on a fired cell, the read pulse shown in FIG. 4G is supplied to the *X* and *Y* sides with a timing of the ninth pulse. However, when the light pen is positioned on a non fired cell, the read pulse shown in FIG. 4H is supplied to the X and Y sides with a timing of the ninth and eleventh pulses. In the case, the composite read pulses with a firing voltage and an erasing voltage as shown in FIG. 4J(*a*) are supplied to the selected cells and the pulse, shown by hatched lines in FIG. 4J, is sent from the light pen to the amplifier and shaper 15.

When the light pen is positioned on a fired cell, the information of the timing having the ninth pulse is sent from the control unit 2 to the read pulser 3. At the same time, as in the first embodiment, *XY* change switch 14 selects an initial condition in accordance with whether the operation is carried out initially to the *X* axis or the *Y* axis. Referring to FIG. 7, the clock pulse having a timing of the ninth pulse is supplied from the control unit 2 to the address counter 21. By receiving the first clock pulse having a timing of the ninth pulse, the output of the address counter 21 places a flip-flop circuit $FF_1$ of the address register in the set condition. The output which appears on the line $x_1$ is supplied to the electrodes ($X_1 \ldots X_8$), and the other lines ($x_2$, $\bar{x}_2$, $x_3$, $\bar{x}_3$, $x_4$, $\bar{x}_4$) are inhibited by the inhibit gates $IG_{11} - IG_{16}$. Then the electrodes ($X_1 \ldots X_8$) are placed in a firing condition.

In this condition, if the light pen is situated on any line of the electrodes ($X_1 \ldots X_8$), an inhibit gate $IG_1$ is inhibited by the signal applied from the amplifier and shaper circuit 15, and no output appears on the line $\bar{x}_1$, and detection is carried out with regard to the electrodes ($X_1 \ldots X_8$). If the light pen is not situated on any line of the electrodes ($X_1 \ldots X_8$), the inhibit gate $IG_1$ is opened, the flip-flop circuit $FF_1$ is reset, the output appears on the line $\bar{x}_1$ with a time delay by a delay circuit $D_1$ and detection is carried out with respect to the electrodes ($X_9 \ldots X_{16}$).

Next, the second counted output is supplied from the address counter 21 to the second flip-flop $FF_2$ of the address register 6, and the outputs of the lines $x_3$, $\bar{x}_3$, $x_4$, $\bar{x}_4$ are annuled by inhibit gates $IG_{12} - IG_{16}$. The operation as mentioned above is repeated until the last line is detected by the light pen 10. Then the $X$ coordinate where the light pen 10 is situated is read out by deciding the least significant digit of the address register 6.

After this, the $XY$ change switch changes from the $X$ coordinate to the $Y$ coordinate and the same operation as with the $X$ coordinate is carried out.

Figure 8:
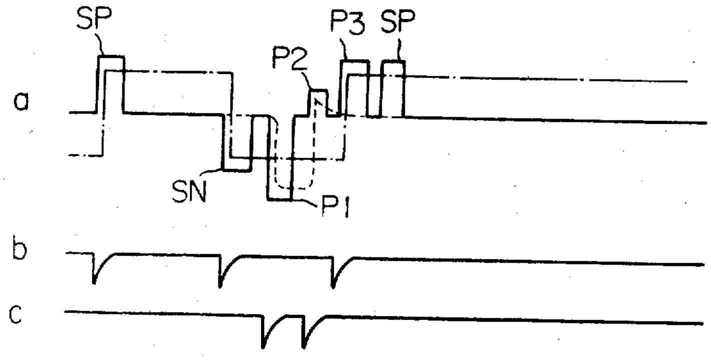
FIG. 8 is a waveform showing a principle of reading the coordinates of information of a light pen regardless of whether the light pen is situated on a fired cell or a non fired cell.

FIG. 8 shows a waveform explaining a principle of reading information regardless of whether the light pen is situated on a fired cell or a non fired cell. A series of read pulses composed of pulses $P_1$, $P_2$ and $P_3$, as shown in (*a*) of FIG. 8, is supplied in order after the ordinary sustaining pulses SP and SN. Referring to (*a*) of FIG. 8, a dashed line shows a wall voltage of the fired cell, and a dotted line shows a wall voltage of the non fired cell. The timing of the discharge spot in the fired cell is shown in (*b*) of FIG. 8, and the timing of the discharge spot in the non fired cell is shown in (*c*) of FIG. 8. Therefore, either a fired cell or a non fired cell can be read by strobing the output of the light pen in the timing of the pulse $P_1$, $P_2$ and $P_3$.

When it is required to read only a fired cell or a non fired cell, only one state can be easily read by selecting the timing of strobing the output of the light pen. This method can be applicable in the above-mentioned two embodiments shown in FIGS. 2 and 6. By applying the method shown in FIG. 8, the reading becomes very easy and simple.

What is claimed is:

1. A system for reading out the coordinates of a matrix type display comprising;

a. a display device having a plurality of radiation points which are arranged in a matrix form and are connected to a plurality of row and column driving lines so as to individually control the radiation of said radiation points;

b. light detecting means positioned in a region corresponding to said radiation points on said display device;

c. a read out signal generator for producing a read out signal;

d. gate circuits connected between said read out signal generator and said driving lines to selectively supply said read out signal to said driving lines;

e. an address circuit for generating output signals for selectively opening said gate circuits in accordance with an address signal;

f. dividing address control means connected to said address circuit for dividing said row and column driving lines into a plurality of blocks, said dividing address control means generating an address signal in turn at every block to address simultaneously said plurality of driving lines belonging to each said block and being controlled by a control signal thereby to gradually divide one of said blocks into a minimum divided block corresponding to one driving line; and, g. circuit means connected to said light detecting means for supplying a control signal to said dividing address control means in accordance with radiation due to said read out signal of said radiation points at which said light detecting means is positioned whereby said system reads out the coordinates of said radiation point at which said light detecting means is positioned from the address condition when said light detecting means detects said radiation due to said read out signal to said minimum divided block corresponding to one driving line.

2. A system for reading out the coordinates of a matrix type display according to claim 1, wherein said display device comprises a plasma display panel having an inherent memory due to a wall charge, and a plurality of discharging points as said radiation points which are provided in a discharging space filled with ionizable gas at each cross point of first and second sets of electrodes arranged at right angles to each other, said first and second sets of electrodes being connected respectively to said row and column driving lines, a sustaining signal generator for generating a sustaining signal which is supplied to said first and second sets of electrodes to sustain the discharge of fired discharging points, and wherein said read out signal comprises a pulse having a voltage level which is capable of changing the polarity of the wall charge produced by the previous sustaining voltage in said fired discharging points, whereby said system reads out the coordinates of said fired discharging point when said light detecting means is positioned on the fired discharging point.

3. A system for reading out the coordinates of a matrix type display according to claim 1, wherein said dividing address control means divides said row and column driving lines into a first half block and a second half block, and when said light detecting means is positioned in said first half block, said read out signal is supplied to one of the half block of said first half block, and when said light detecting means is not positioned in said first half block said read out signal is supplied to one of the half block of said second half block.

4. A system for reading out the coordinates of a matrix type display according to claim 1, wherein said display device comprises a plasma display panel having an inherent memory due to a wall charge, and a plurality of discharging points as said radiation points which are provided in a discharging space filled with ionizable gas at each cross point of first and second sets of electrodes arranged at right angles to each other, said first and second sets of electrodes being connected respectively to said row and column driving lines, and a sustaining signal generator for generating a sustaining signal which is supplied to said first and second sets of electrodes to sustain the discharge of fired discharging points, and wherein said read out signal comprises a pulse having a voltage level which exceeds the firing voltage and an erase pulse which follows said pulse, whereby said system reads out the coordinate of a non-fired discharging point when said light detecting means is positioned on the non-fired discharging point.

5. A system for reading out the coordinates of a matrix type display according to claim 1, wherein said display device comprises a plasma display panel having an inherent memory due to a wall charge, and a plurality of discharging points as said radiation points which are provided in a discharging space filled with ionizable gas at each cross point of first and second sets of electrodes arranged at right angles to each other, said first and second sets of electrodes being connected respectively to said row and column driving lines, and a sustaining signal generator for generating a sustaining signal which is supplied to said first and second sets of electrodes to sustain the discharge of fired discharging points, whereby said read out signal is provided with a first pulse which has the same polarity as that of the previous sustaining voltage and has a voltage level which exceeds that of the firing voltage, a second pulse which follows said first pulse and having a level of the erasing voltage, and a third pulse which follows said second pulse and having a voltage level substantially equal to said sustaining voltage, and when the light detecting means is positioned on a fired discharging point, the radiation of a fired discharging point due to said third pulse is detected, and when the light detecting means is positioned on a non fired discharging point, the radiation of a non fired discharging point due to said first pulse is detected.

* * * * *